United States Patent [19]
Welch

[11] Patent Number: 5,216,340
[45] Date of Patent: Jun. 1, 1993

[54] DUAL WINDSHIELD WIPER MOTOR SYNCHRONIZATION

[75] Inventor: David W. Welch, Columbus, Miss.

[73] Assignee: United Technologies Motor Systems, Columbus, Miss.

[21] Appl. No.: 850,611

[22] Filed: Mar. 13, 1992

[51] Int. Cl.[5] ............................................. B60S 1/08
[52] U.S. Cl. ...................................... 318/443; 318/41; 318/DIG. 2
[58] Field of Search ................. 318/37, 41, 66, 67, 318/68, 85, 443, 444, DIG. 2; 15/250.16, 250.17

[56] References Cited

U.S. PATENT DOCUMENTS

| | | | |
|---|---|---|---|
| 3,721,878 | 3/1973 | Gumbert | 318/443 |
| 4,405,887 | 9/1983 | Tamura et al. | 318/443 |
| 4,431,954 | 2/1984 | Carpenter et al. | 318/443 |
| 4,585,980 | 4/1986 | Gille et al. | 318/444 |
| 4,665,488 | 5/1987 | Graham et al. | 318/444 X |
| 4,670,695 | 6/1987 | Licata et al. | 318/443 |
| 4,881,019 | 11/1989 | Shiraishi et al. | 318/68 |
| 4,900,995 | 2/1990 | Wainwright | 318/443 |
| 4,900,996 | 2/1990 | Wainwright | 318/443 |

*Primary Examiner*—Bentsu Ro
*Attorney, Agent, or Firm*—Eckert Seamans Cherin & Mellott

[57] ABSTRACT

A windshield wiper system has two motors. Each propels its own wiper blade. A blade parking disk is attached to each motor and contains a conductive and a non-conductive segment. Electrical power supplied through the conductive segment to the motor from a "parking contact", is interrupted by the non-conductive segment, parking the blade. During normal operation, the voltage change on the "parking contact" is sensed for each motor to determine if one motor is faster than the other. If the speed difference exceeds a set level, power to the faster motor is interrupted for a preset time interval during each rotation of the parking disk, until the difference is less than the set level. The voltage on the parking contact is also sensed for the higher voltage produced if the motors are operating at high speed. If the motors are operating at high speed, the preset time interval is increased and the allowable speed difference is reduced.

11 Claims, 3 Drawing Sheets

DUAL WINDSHIELD WIPER MOTOR SYNCHRONIZATION

TECHNICAL FIELD

This invention relates to windshield wipers, in particular, techniques for synchronizing the operation of electric motors driving windshield wipers.

BACKGROUND OF THE INVENTION

It is common in many vehicles to employ two independent windshield wiper motors, each operating its own wiper blade. In some cases, this is made necessary by a vehicle structure precluding the use of a single motor and windshield wiper connecting linkages between the two windshield wipers, a very common arrangement. In addition, sometimes there is a need, e.g., due to government regulations, to have each windshield wiper operated by its own electric motor for safety/reliability. One example of this is found in some codes prescribing the school bus construction standards. Use of two independent motors, however, produces special synchronization problems in avoiding random wiping patterns.

DISCLOSURE OF THE INVENTION

Objects of the present invention include providing a technique for synchronizing the motion of windshield wipers in a windshield wiper system in which each windshield wiper is independently powered by an electric motor.

According to the present invention, each motor in a multiple motor wiper system controls a wiper parking subsystem, for instance, the contact plate made of conductive material containing a peripheral insulated region, found on existing vehicles.

According to the invention, the parking subsystem performs two functions: the non-conductive portion disconnects power to the motor when the windshield wiper is at the parked position (parking the wiper blade), and, in addition, provides a means for triggering a control system that temporarily slows the speed of the faster of the two motors, preferably by deenergizing it for a short-time interval, based upon the extent of asynchronization sensed from the relative location of the non-conductive portions associated with each motor. Both wiper motors are controlled by a common manual control switch, both motors always operating in the same mode, i.e. high speed; low speed; or park.

According to the present invention, the speed reduction of the faster motor, the "leading motor", is scaled if the wipers are in a higher speed mode compensating for the greater momentum of the wiper and motor at higher speeds. Detection of this higher speed is made, according to the present invention, by sensing the higher voltage on the motor brushes that arise from the back EMF on the wiper electric motor when the wiper is operating at higher speed, which voltage also appears on the conductive portion of the contact plate.

According to the present invention, voltage changes on the contact plate are sensed to synchronize the motors and adjust the magnitude of the speed reduction of the faster motor.

According to the invention, the faster of the two motors operating in either slow or fast mode is slowed only if the asynchronization exceeds a set level.

A feature of the present invention is that it is reliable, economical and can be retrofitted to existing systems, especially those having such a conductive wiper parking plate with an electrically isolated region for the sole purpose of parking the wiper blade at a preset location. The invention may be used, however, with systems that park the wipers using a switch that is opened when the blade reaches the parked position.

Other objects, benefits and features of the invention will be apparent to one skilled in the art from the explanation that follows.

BEST MODE FOR CARRYING OUT THE INVENTION

Figure 1:
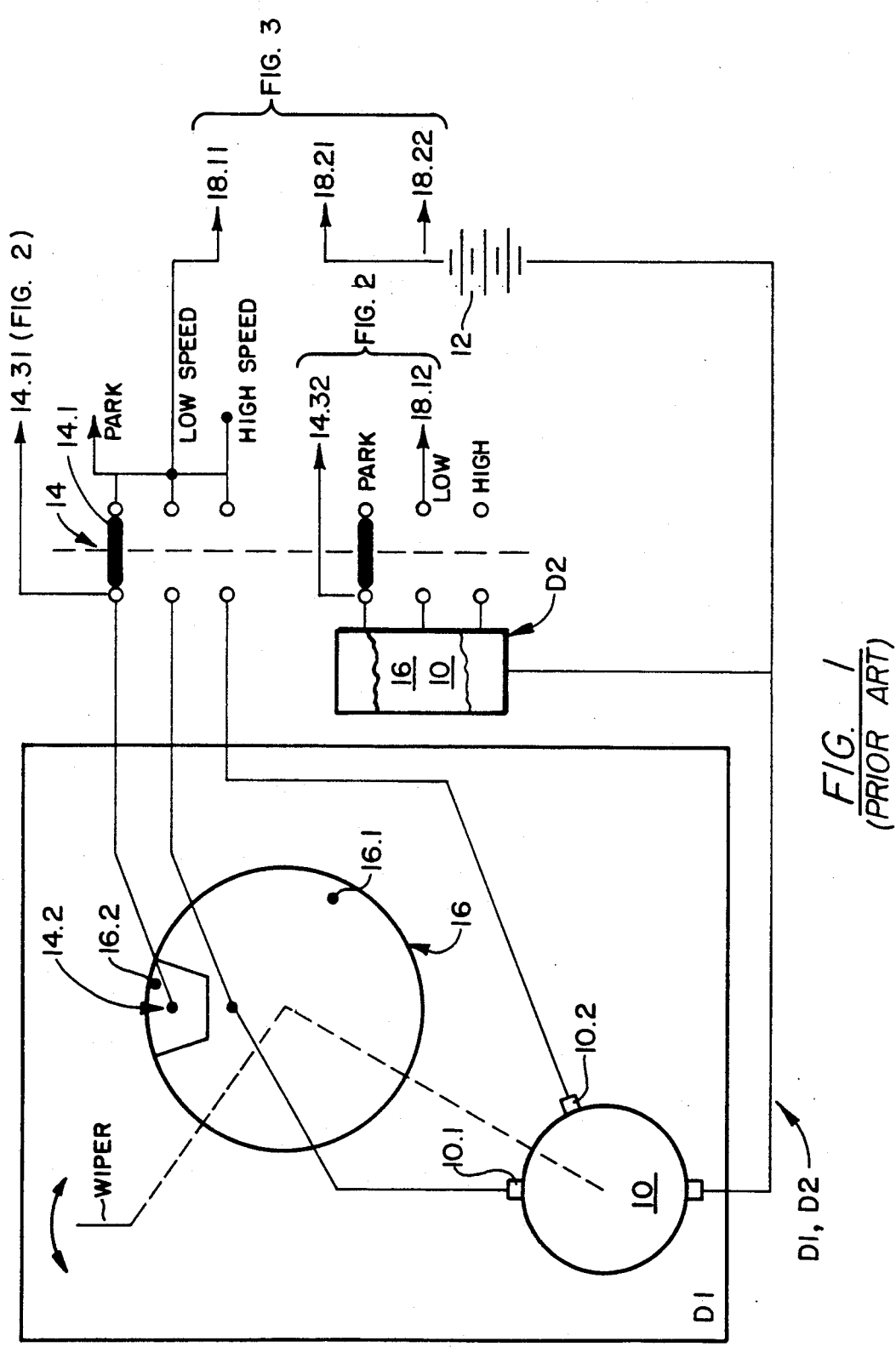
FIG. 1 shows a conventional two speed wiper drive with a motor, having a disk with an insulated segment to park the blade.

FIG. 1 shows the individual configuration of possible wiper drives envisioned for the application of the present invention in a traditional wiper system having two independent wiper drives D1 and D2, each having a "parking disk" or plate 16 for its respective motor 10, but for convenience only one of the disks is shown. Specifically, each motor drive has an electric motor 10, having a low speed brush 10.1 and a high speed brush 10.2. The motor is powered by a DC supply 12. A manual selector switch 14 controls three possible modes of operation for the two wiper motor drives: park, high speed, low speed. The switch contains moveable elements 14.1 which, at one position supplies power only to park contact 14.2 which alternately rides upon conductive material region 16.1 and insulated portion 16.2. At a second position, the switch 14.1 establishes an electrical path from the supply 12 to the low speed brush 10.1, to cause the motor to operate at low speed. The low speed terminal of switch 14 is also connected to contact 14.4 that rides on the region 16.1, exposing the region to the voltage of the low speed contact, but not using the region to provide power to the low speed brushes. At a third position, the switch establishes an electrical connection to the high speed brush 10.2, which causes the motor to operate at a high speed. As the motor rotates, the disk rotates in synchronism.

When switch element 14.1 is placed in "Park" and contact 14.2 is on the conductive region 16.1, a path from power supply 12 is provided from contact 14.2 through conductive region 16.1 to contact 14.4, to low speed brush 10.1. This path continues to be provided until disk 16 rotates to a position, where contact 14.2 rests on insulated region 16.2 and the motor is deengaged and the wiper is parked. It should be understood, that in the synchronization circuit set out and discussed below, when the motor is operating at high speed, a back EMF voltage is produced at the low speed brush 10.1 which is greater than the supply voltage from the power supply 12. One aspect of the present invention, is to use this higher voltage to determine, for the purposes of controlling the level of synchronization, whether the motor is in high speed or low speed mode of operation. As described below, the two motors are synchronized by momentarily interrupting the power from the power supply 12 to the motor, a process accomplished through the installation of relays K1 and K2 (FIG. 2), connected to the circuit FIG. 1 at points 18.1 and 18.2, where "D1" and "D2" identify the two drives of the types shown in FIG. 1 with the same reference numerals. The operation of these relays, individual to each drive D1, D2, momentarily interrupts the power to the motor, slowing the wiper blade motion.

Figure 2:
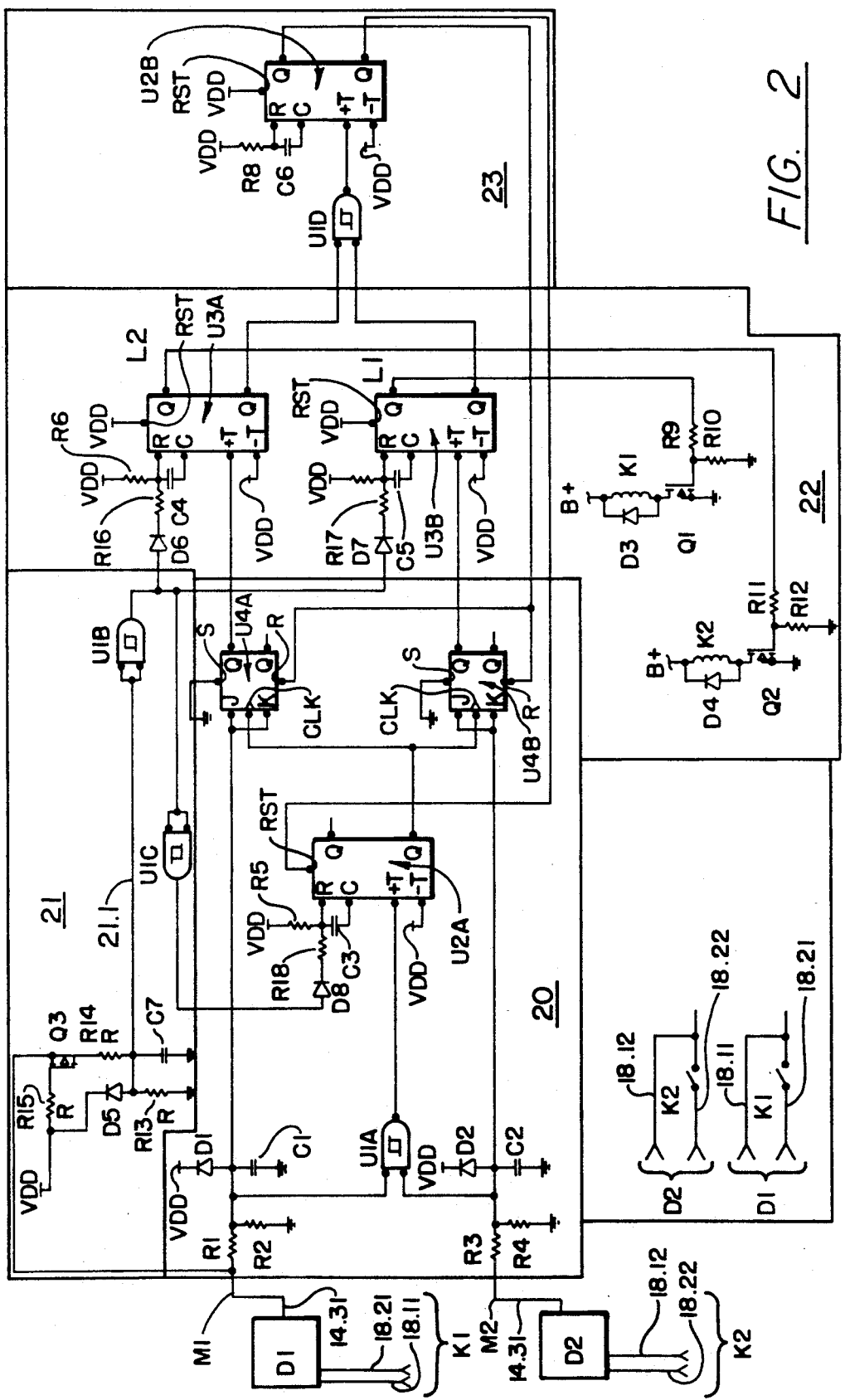
FIG. 2 is a schematic of a synchronization system embodying the invention for use with two drives of the type shown in FIG. 1.

In FIG. 2, each motor drive D1 and D2 is connected by a line 14.31 and 14.32 to the input of an "asynchronization detector" 20 and high speed/low speed detector 21. As explained in the following discussion, the extent of asynchronization between the drives D1 and D2 controls the operation of the relay control 22 to open one of the normally closed relays K1, K2, which are connected to drives D1 and D2 by lines 18.11, 18.21, 18.12 and 18.22, as shown in both FIGS. 1 and 2. In particular, the relay associated with the faster moving ("leading") drive, D1 or D2, is momentarily opened. The operation of the control 22 initiates the operation of a reset circuit 23, to reset various sections of asynchronization detector 20 and the relay control 22 following the operation of the relay, which takes place once during each revolution of the disk 16, until the drives are within a synchronization zone (see signal U2A in FIG. 3). Reset circuit 23 also serves to inhibit a false indication of which motor is leading or lagging the other. This is accomplished by reset circuit 23 generating a reset pulse having a duration slightly less than one revolution of drives D1 or D2.

Figure 3:
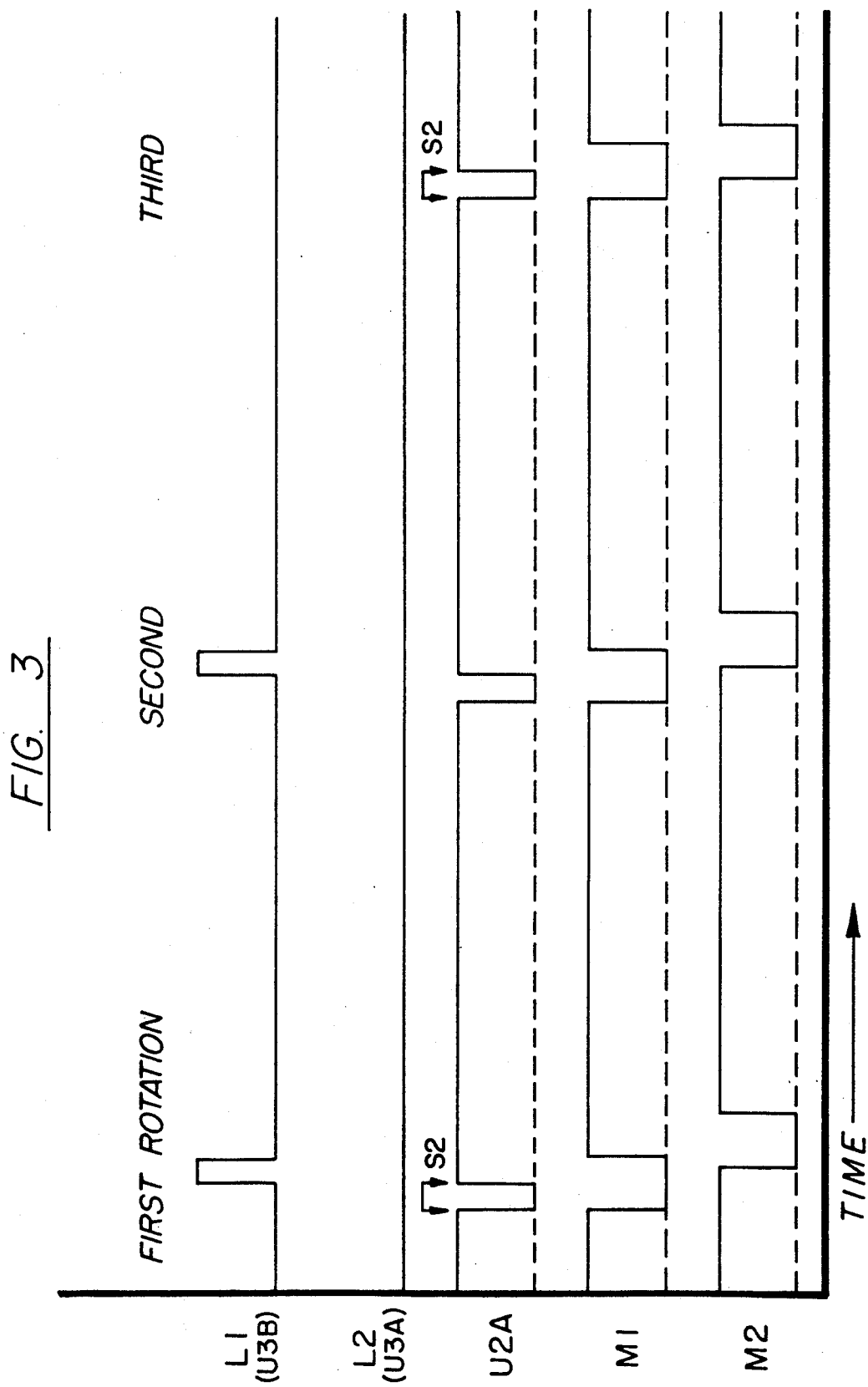
FIG. 3 is a graph of signals, all on a common time base, produced in the system shown in FIG. 2.

Referring to FIG. 3, the waveforms M1 and M2 shown there represent the voltages (signals) that would appear at points M1 and M2 as a result of the rotation of each disc 16. Voltages M1 and M2 should be observed going from a long duration high voltage to a short duration low voltage, the low voltage occurring when the contacts 14.2, associated with each drive, coincides or reaches the insulated section 16.2. The particular relationship between the signals M1 and M2 shown in FIG. 3 at the left demonstrates an asynchronization level that would be corrected by the present invention in the manner now described.

Referring specifically to FIG. 2, the voltages at M1 and M2 are both applied to a gate U1A, and when either one of the signals goes to zero, monostable U2A produces an output comprising the signal shown as U2A in the FIG. 3. The point at which signal U2A drops from the high voltage to a low voltage begins the time interval for a "sync zone" (SZ), which is an acceptable level of asynchronization between the two motors. At the same time that voltages M1 and M2 are applied to the input of the circuit 20, they are also applied to the J/K inputs of flip-flops U4A and U4B. The outputs of the flip-flops U4A, U4B can only change state if the inputs on the J/K terminals are high when the output from the monostable U2A switches from low to high.

FIG. 3 shows conditions (high or low state) at signal outputs of U3B, U3A, U2A, and voltages M1 and M2 in order to illustrate one major control function of the circuit. The voltages M1 and M2 appear as negative going pulses from each disk 16 as the contacts move off conductive segment 16.1 and onto insulated portion 16.2 and then back onto segment 16.1. U2A represents a negative pulse produced by U2A because it is triggered on by the negative edge of M1. Pulse U2A lasts for a preset duration. Pulse U2A swings positive while M1 is still low and M2 is still high. This condition signifies that M1 is leading M2 by an unacceptable amount which triggers a short duration pulse from U3B. The pulse momentarily opens a relay K1 which supplies power to drive D1. Even at the center of FIG. 3, M1 still leads M2 by an unacceptable amount even though the pulses of M1 and M2 are closer together than in the first instance. The sequence continues for successive rotations of the disk, and M1 is slowed down even more by the second pulse produced by U3B. As the disks rotate and the insulated segment comes under the contact a third time, the pulses of M1 and M2 are more closely synchronized in this way, as shown as the waveforms of M1 and M2 are viewed from left to right, until, as shown at the extreme right, they are synchronized to a pre-determined acceptable degree (the delay is within SZ). At that time, no pulse is generated by U3B. This condition exists because the timed positive going pulse of U2A occurs while both M1 and M2 are at low voltage state.

The extent of the speed reduction determined by the duration of the pulse from the monostable U3B, which determines how long the contacts K1.1 are open. This is determined by the time constant associated with R17, R7 and C5. The operation of the monostable U3B or its counterpart monostable U3A is applied through a gate causing the operation of another monostable U2B and the output from this monostable is applied to reset all of the asynchronization circuits in the asynchronization detector 20. This signal is also used to inhibit action for a time period equal to $\frac{1}{2}$ to $\frac{3}{4}$ of a wipe cycle.

The signal M1 is also applied to a high speed/low speed detector 21, consisting of a FET Q3 biased so that it only conducts when the voltage on its source is greater than the supply voltage shown as VDD. As mentioned previously, when the motor in either of the drive D1 or D2 is operating at low speed the voltage at point 14.3 is roughly equal to the supply voltage, which is not sufficiently greater than VDD to cause conduction of the FET Q3. As a result there is no change in the voltage on line 21.1. However, when the motor is operating at high speed, the voltage at 14.3 is sufficient to cause the FET Q3 to conduct through R14 and R13, which causes the voltage on capacitor C7 to rise. The time constant associated with capacitor C7, ostensibly based on the value of R13, is selected so that the capacitor's voltage on line 21.1 does not drop below a level sufficient to operate gate U1B when the signal on line 14.3 disappears as the contact 14.2 enters the insulated section 16.2. The increase in voltage on 21.1 causes a change in the state of the gates U1B and U1C, configured as inventor/buffers. The output of buffer U1B is high when the output on U1C is low and vice versa. When the output on buffer U1C is high, it causes the diode D8 to conduct. The result is a decrease in the effective resistance associated with capacitor C3, decreasing the time constant for the monostable U2A, narrowing the "synch zone". The reason for this is that at a higher motor speed, less asynchronization is tolerable. Moreover, when a high speed signal is detected, as represented by a voltage increase on the line 21.1, the output from gate U1B goes from high to low. This turns off the diodes D6 and D7. The effect is an increase in the time constant associated with monostables U3A and U3B, increasing the time that either relay K1 or K2 (the "leading motor relay") is actuated. The reason for this is that at a higher speed it is necessary to leave the motor off or unpowered for a longer period of time because there is less available time to accomplish resynchronization and there is more momentum due to the higher speed of all the components.

While the foregoing describes the best mode for carrying out the invention, it may be possible to incorporate modifications, in whole or in part, to the embodiment that has been shown and described. For example, an attractive aspect of the invention is that it can be easily retrofitted into an existing two-motor uncoupled wiper system, basically by breaking the power lines between the battery and the motor as shown in FIG. 1 and connecting the relays and lines to the existing switch terminals and power leads. Naturally, it is also possible to build the entire control circuitry shown in FIG. 2 as a single integrated circuit. Other modifications and variations will be apparent to one skilled in the art.

We claim:

1. A windshield wiper drive comprising a pair of motors, each operating a wiper; a power source in electrical connection with each motor for energizing each motor to move the wiper; wiper parking means associated with each motor for providing a circuit interruption in said electrical connection when the wiper operated by the motor is at a wiper park position, characterized by a motor synchronizer responsive to the motion of said wiper parking means to synchronize the speed of the motors comprising:
   means for providing a first signal for a first time interval in response to said circuit interruption to a first motor in said pair of motors;
   means for receiving said first signal and providing a second signal upon said circuit interruption to a second motor in said pair of motors following said first time interval and for preventing the production of said second signal if said circuit interruption to said second of the motors occurs during said first time interval;
   means for providing a third signal for a third time interval in response to said second signal; and
   means for receiving said third signal and deenergizing said first motor for said third time interval following said circuit interruption in the connection to said first motor.

2. A windshield wiper drive according to claim 1, wherein said wiper parking means comprises a conductive member, rotated by the motor, with a nonconductive segment and contact brushing on said member and arranged such that a circuit connection through the contacts to a voltage input to the motor is completed through a conductive portion of said member or is broken by said non-conductive segment depending on the position of the wiper as the motor operates, characterized in that:
   said means for providing said first signal is responsive to a change in voltage on one of said contacts during each rotation of the member, said contact brushing on said nonconductive segment to interrupt the connection to the other contact.

3. A windshield wiper drive according to claim 2, characterized in that said means for providing said third signal comprises means for increasing said third time interval in response to said change in voltage exceeding a preselected selected level.

4. A windshield wiper drive according to claim 3, characterized in that said one contact is connected to a terminal of a switch used for providing power to the motor through said contacts to park the wiper and said voltage change is sensed from said terminal.

5. A windshield wiper drive according to claims 3 or 4, characterized in that said voltage is the voltage across low speed brushes on the motor.

6. A windshield wiper drive according to claim 1, wherein each motor is operable at a high speed or a low speed and at said high speed said wiper parking means produces a characteristic signal on said circuit interruption, characterized in that:
   said means for providing said first signal includes means for increasing said first time interval in response to said characteristic signal.

7. A windshield wiper drive according to claim 6 characterized in that said characteristic signal comprises a higher voltage produced on low speed brushes on each motor when each motor is operated at higher speed.

8. A method for synchronizing the movement of windshield wipers in windshield wiper drive comprising a pair of motors, each operating a wiper, a power source in electrical connection with each motor for energizing each motor to move the wiper, wiper parking means associated with each motor for providing a circuit interruption in said electrical connection when the wiper operated by the motor is at a wiper park position, characterized steps of:
   installing a switch between the power source and each motor;
   providing a first signal for a first time interval in response to said circuit interruption to a first motor in said pair of motors;
   receiving said first signal and providing a second signal upon said circuit interruption to a second motor in said pair of motors following said first time interval and for preventing the production of said second signal if said circuit interruption to said second motor occurs during said first time interval;
   providing a third signal for a third time interval in response to said second signal;
   receiving said third signal and deenergizing said first motor for said third time interval following said circuit interruption in the connection to said first motor by applying said third signal to said switch between said first motor and the power source.

9. A method according to claim 8, wherein said wiper parking means comprises a conductive member rotated by the motor with a nonconductive segment and contact brushing on said member and arranged such that a circuit connection through the contacts to the motor is completed through a conductive portion of the member or is broken by said non-conductive segment depending on the position of the wiper actuated by said motor, characterized in that:
   said step for providing said first signal is responsive to the change in voltage on said contacts during each rotation of the member.

10. A method according to claim 9, wherein each motor is operable at a high speed or a low speed and at said high speed said wiper parking means produces a characteristic signal, characterized in that:
   said step for providing said first signal includes a step for increasing said first time interval in response to the presence of said characteristic signal.

11. A method according to claims 9 or 10, characterized by the steps of:
   connecting a terminal on said switch for receiving said first signal, said terminal being connected by said wiper parking means to a low speed brush on said motor and said switch having a park position at which said terminal is connected to a terminal that is connected to the power source to supply power to the motor to park the wiper.

* * * * *

UNITED STATES PATENT AND TRADEMARK OFFICE
CERTIFICATE OF CORRECTION

PATENT NO. : 5,216,340
DATED : June 1, 1993
INVENTOR(S) : David W. Welch

It is certified that error appears in the above-indentified patent and that said Letters Patent is hereby corrected as shown below:

Col. 4, line 49, "inventor" should read --invertor--.

Signed and Sealed this

Fifth Day of April, 1994

*Attest:*

BRUCE LEHMAN

*Attesting Officer*     *Commissioner of Patents and Trademarks*